(No Model.)

W. DEY.
WATERING TROUGH.

No. 603,321. Patented May 3, 1898.

Witnesses

Inventor
William Dey.
by _____
Attorney.

UNITED STATES PATENT OFFICE.

WILLIAM DEY, OF GOLDEN GATE, MINNESOTA.

WATERING-TROUGH.

SPECIFICATION forming part of Letters Patent No. 603,321, dated May 3, 1898.

Application filed June 24, 1897. Serial No. 642,170. (No model.)

*To all whom it may concern:*

Be it known that I, WILLIAM DEY, residing at Golden Gate, in the county of Brown and State of Minnesota, have invented a new and useful Watering-Trough, of which the following is a specification.

My invention relates to watering-troughs; and the object thereof is to provide automatic means in connection therewith which when the animal places its head in the trough to drink is operated to turn on a faucet to allow water to flow in the trough and when its head is withdrawn operates to shut off the flow of water. I accomplish this object by providing a hinged flap within the trough which is connected by a rack with a cog carried on the faucet, so that when the flap is moved by the animal's head it will move the rack to turn the cog, which opens the faucet. When the head is withdrawn, a spring acts upon the flap to return it to its normal position, thereby shutting off the flow of water.

In order that my invention may be fully understood, I will proceed to describe the same, with reference to the accompanying drawings, in which—

Figure 1:
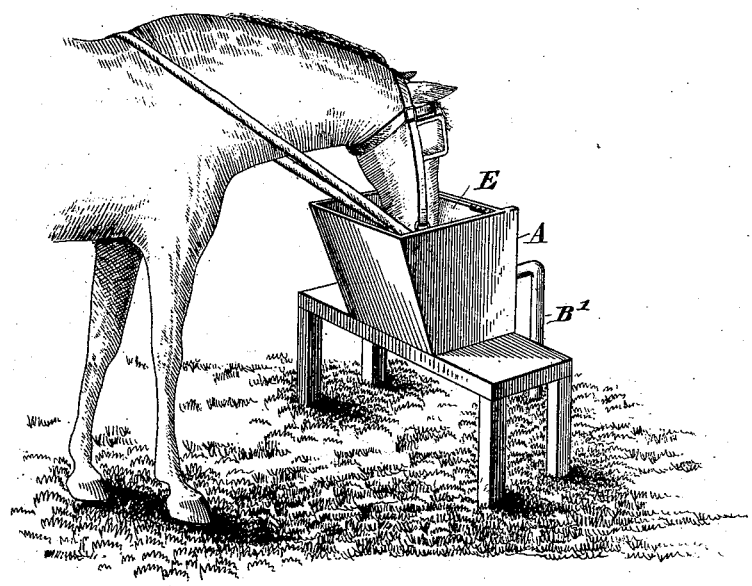
Figure 2:
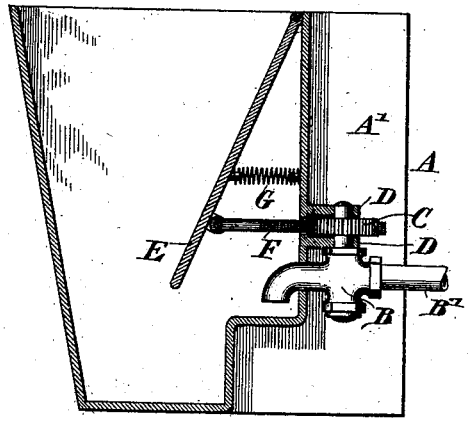
Figure 3:
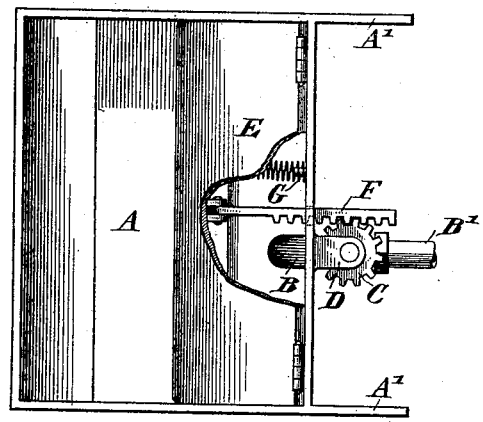

Figure 1 is a view showing the practical application of my invention. Fig. 2 is a vertical section of the same, and Fig. 3 is a top view partly broken away to show the faucet-operating mechanism beneath.

In the said drawings, A represents a trough which may be of any desired shape and constructed of any material. In the drawings I have shown it provided with an inclined front, straight sides, and back which is of the shape shown in order to allow for the arrangement of mechanism hereinafter set forth. The sides are provided with the extensions A' to permit of the trough resting firmly on the support provided for it.

B represents a faucet of any construction connected with the water-supply pipe B' and so arranged that it discharges water into the trough from the rear thereof.

The valve-stem of the trough is provided with the cog or pinion C, and the extensions or lugs D are provided on the trough to serve as bearings for the valve-stem.

E represents a flap hinged at one end to the edge of the trough so as to cover the faucet. It has movably connected to it a rack-bar F, which passes through an opening in the rear side of the trough and is in engagement with the cog or pinion, so that when the flap is moved the rack will turn the pinion to open and close the faucet. A spring G is provided at the rear of the flap to return it to normal position after the animal's head has been withdrawn and in this manner close the faucet to shut off the supply of water.

In practice I so arrange the trough and flap that when it is in its normal position the space between it and the trough side will be narrow, so that before the animal can reach the water in the bottom of the trough the flap will have to be moved. When this is done, the faucet will be opened to allow water to flow into the trough, and when the head is withdrawn the spring will move the trap and in this manner shut off the supply of water.

Having thus fully described my invention, what I claim as new, and desire to secure by Letters Patent, is—

In a watering-trough, the combination of the water-inlet, a valve for controlling the same, a cog or pinion provided on the valve-stem, a flap hinged to the trough and extending into the same, a rack-bar connected with said flap and in engagement with the cog or pinion, and a spring for returning the flap to normal position, substantially as shown and described.

WILLIAM DEY.

Witnesses:
F. B. STRONG,
ARCH HONEYMAN.